Figure 1:
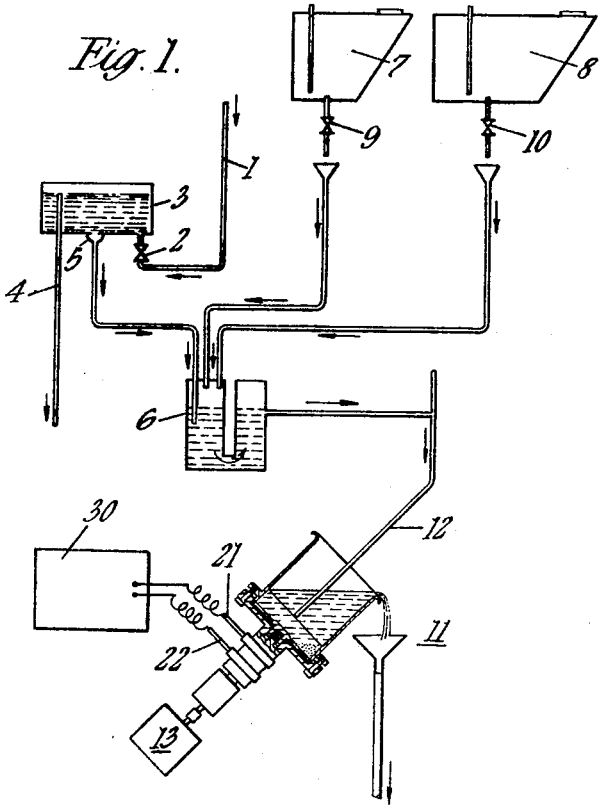

July 10, 1962    A. C. HARVEY    3,043,764
GALVANIC DETECTOR

Filed April 27, 1959    2 Sheets-Sheet 2

Inventor
A.C. Harvey
By Elmer Downing Diebold
Attys.

United States Patent Office 3,043,764
Patented July 10, 1962

3,043,764
GALVANIC DETECTOR
Archibald Charles Harvey, London, England, assignor to The Paterson Engineering Company Limited
Filed Apr. 27, 1959, Ser. No. 809,178
Claims priority, application Great Britain Apr. 30, 1958
2 Claims. (Cl. 204—195)

This invention relates to a detector of the state of the chemical constitution of a liquid making use of the measurement of an electric current produced consequent upon depolarisation of a galvanic couple, formed by electrodes of dissimilar metals, placed in the liquid, and in particular the detection and recording of the amount of residual chlorine present in water.

Such apparatus hitherto used suffers from the disadvantages that in order to obtain suitable and reliable measurements it is necessary to provide some means of keeping surfaces of the metal electrodes, which are exposed to the liquid, continuously clean.

This has been done either by the use of an abrasive material which is circulated by a water jet or injector device or by the agitation of glass beads or similar material. Such devices are not easily dismantled for cleaning without the risk of upsetting their characteristics and also tend to retain any foreign bodies or deposits which may inadvertently enter with the sample liquid. Also, due to reliance on water or liquid motive power for agitation they can become unreliable due to dirt or foreign bodies blocking the waterways and so interfering with the circulation.

The object of the present invention is to provide an improved means of cleaning the exposed surfaces of the electrodes not subject to the above disadvantages.

The invention consists in a detector of the state of the chemical constitution of a liquid comprising a galvanic couple formed of electrodes of dissimilar metals adapted to be immersed in a liquid and means for measuring the electric current produced, the said electrodes being mounted for movement into and out of a bed of abrasive material to clean them.

The invention further consists in a detector as set forth in the preceding paragraph constructed in the form of a cup rotatable continuously about an axis inclined to the vertical, the electrodes being concentric and annular in form and attached to said cup adjacent the bottom thereof, the bed of abrasive being of loose granular form reposing in the angle between the bottom and side of the cup and with which the electrodes make contact with rotation of the cup.

The invention still further consists in a construction as set forth in the preceding paragraph and having contact rings or discs each electrically connected to an electrode and fixed contact means contacting the rings or discs and connected with an indicating and/or recording device.

The invention still further consists in a construction as set forth in any preceding paragraph having tank and pipe means for providing a continuous flow of the liquid past the electrodes together with a chemical reagent.

The device containing the electrodes which form the galvanic couple consists essentially of a cup which is rotated by an electric motor or water motor and whose axis is inclined at a suitable angle to the vertical. The electrodes are so disposed at the sides and base of the cup that a small quantity of sand or other electrically non-conductive and chemically inert abrasive material, sufficient to cover the exposed electrode surfaces in the bottom corner of the cup, will roll over the electrode surfaces as the cup rotates, the abrasive material itself being retained by gravity in the bottom of the cup. The scrubbing action of this material keeps the electrode continuously cleaned.

The electrodes in the revolving cup are constructed of dissimilar metals, suitable combinations being gold and copper, or platinum and copper, but there are many other well known combinations which will produce an electric current of galvanic action in a suitable liquid.

The electrodes can be arranged in different ways. In its simplest form the cup is constructed of one of the pair of metals (e.g. copper) and the other metal is in the form of a ring (e.g. gold) set in an insulating material in the base of the cup.

In another form the cup is made of an insulating material and the electrodes consist of alternate rings of gold and copper, separated by an insulator, mounted inside the cup, with or without a metal base which can form part of one bank of electrodes. In this case the number and surface area of these electrode rings can be varied to suit the requirements of a particular case.

The treated water is delivered into the cup through a tube held at a suitable angle in such a manner that the jet of water is caused to pass over the exposed surfaces of the two metal electrodes. In another version a displacer tube, having an external diameter somewhat less than that of the internal diameter of the cup is so arranged that the treated water descends to the bottom of the cup and is evenly deposited and constrained to pass over the exposed surfaces of the electrodes. The water then spills over the lip of the cup and is caught by a funnel and led away to drain, carrying with it any foreign matter which may inadvertently enter the water.

Each electrode, or set of electrodes, is connected by wires to two contact rings or discs mounted on the driving spindle of the cup. These make electrical contact with either brushes set in a holder, or a small quantity of mercury contained in suitable holders. From these the electric current is led to a conventional electrical or electronic recording and/or indicating instrument, so arranged as to record the value of the electrical current passing at any one time. The reading so obtained bears a direct relationship to the chlorine residual, or other chemical property, present in the sample water.

In the remainder of the instrument the water to be sampled is led from the source of supply to a small constant head tank, fitted with an overflow outlet to maintain level. The water for use in the instrument passes through an orifice set in the constant head tank which restricts the flow to a predetermined amount. This flow then passes to a mixing chamber which is so arranged as always to contain a predetermined quantity of water, thus allowing adequate time for mixing with a chemical reagent or reagents. The entry pipe is arranged tangentially so that a swirling action takes place.

The chemical reagent, the object of which is to render the sample water in a suitable condition for measurement, is supplied from a constant head type of container, either through a preset capillary tube or an adjustable orifice valve, and it is delivered at a set rate into the top of the mixing chamber where it is thoroughly mixed with the sample water due to the agitation induced by the water inlet.

Where readings are required of different types of residual chlorine or other chemical characteristics of the water it may be necessary to use more than one chemical reagent, but the general arrangement follows the same lines as that described above. The treated water flowing out of the mixing chamber passes to the device already described.

Figure 2:
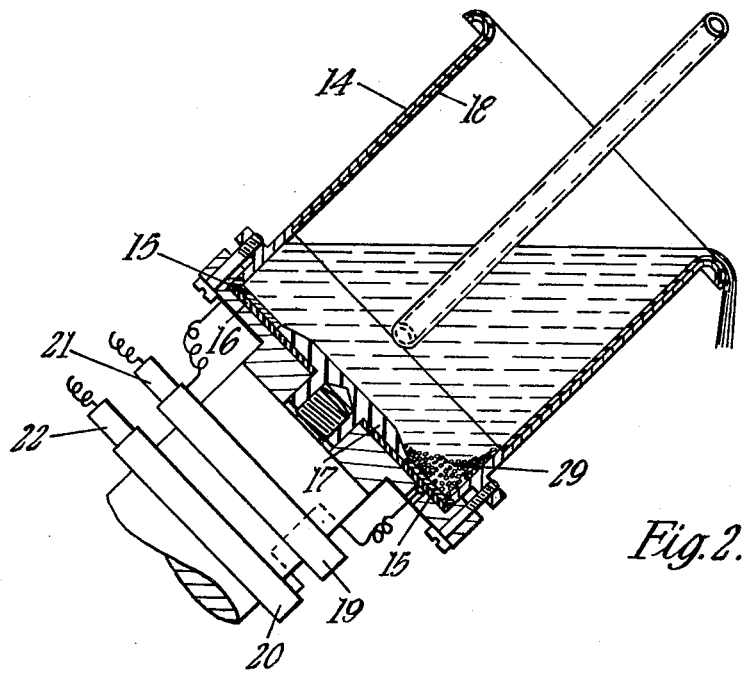
Figure 3:
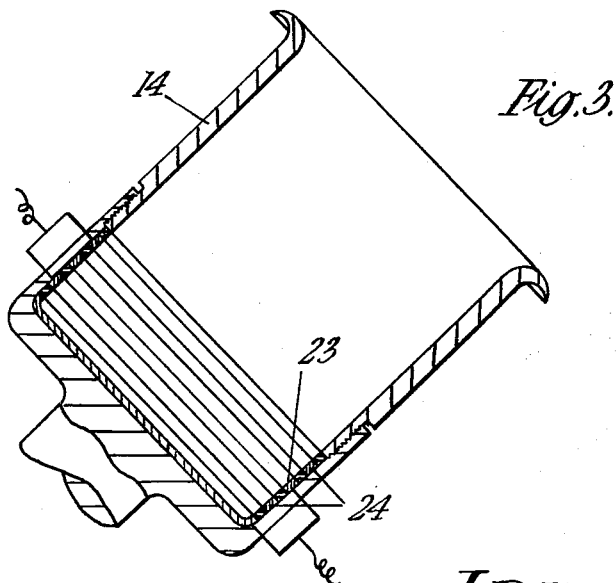

The accompanying drawings show by way of example only several embodiments in accordance with the invention in which:

FIGURE 1 is a diagrammatic lay-out of a complete apparatus incorporating form of detector, FIGURE 2 shows a section of details of the construction of the detector of FIGURE 1, FIGURE 3 shows a section of an alternative form of construction of detector.

In the complete instrument shown in FIGURE 1 the water to be sampled is led by the pipe 1 from the source of supply by way of the valve 2 to the small constant head tank 3, fitted with an overflow outlet 4 to maintain the water level constant. The water passes through an orifice 5 which restricts the flow to a predetermined rate. The water passes to a mixing chamber 6 which always contains a predetermined quantity of water, thus allowing adequate time for mixing with a chemical reagent or reagents.

The chemical reagents are supplied from constant head type of containers 7 and 8 by way of the valves 9 and 10, so that they can be delivered at a set rate into the top of the mixing chamber 6 where they are thoroughly mixed with the sample water, due to the agitation induced by the water inlet.

The treated water flows within the mixing chamber to the detector 11 by way of the pipe 12.

The detector 11, which is rotated by the motor 13, is shown in detail in FIGURE 2 and comprises a cup 14 which is rotated about its axis and is inclined at a suitable angle to the vertical. The cup 14 is constructed in one metal, for example copper, while the other electrode 15, for example gold, is in the form of a ring set in electrically insulating material 16 and 17 in the base of the cup. The upper portions of the cup 14 are covered with an insulating material 18. The electrodes are connected separately by wires to the contact rings 19 and 20, to which electrical connection is made to the current measuring apparatus 30 (FIGURE 1) by the fixed brushes 21 and 22. As the cup rotates the electrodes are cleaned by the abrasive material 29.

In the construction shown in FIGURE 3 the electrodes are formed as alternate rings of copper 23 and gold 24 insulated from one another, alternate rings being connected together and to the contact rings. The bottom of the cup is also made of copper and is connected to the copper ring.

The electrical current generated in the cup 14 is led to a conventional electrical or electronic recording and/or indicating instrument, arranged to record the value of the electric current passing at any time. The reading obtained bears direct relationship with the chlorine residual or other chemical property of the water.

It is to be understood that the above description is by way of example only and that details for carrying the invention into effect may be varied without departing from the scope of the invention.

I claim:

1. In a detector of the state of the chemical constitution of a liquid comprising a galvanic couple formed of electrodes of dissimilar metals adapted to be immersed in said liquid and measuring means for measuring the electric current produced, the improvement comprising an imperforate cup-like vessel for holding the liquid, means mounting the cup for rotation about its axis while inclined to the vertical, at least part of the material of which the cup is constructed forming one of the electrodes with which the liquid is in contact, and a bed of abrasive material heavier than the liquid and within the cup in contact with at least the said one of the electrodes to clean it upon rotational movement of the cup, said abrasive material being electrically non-conductive and chemically inert.

2. In a detector of the state of the chemical constitution of a liquid comprising a galvanic couple formed of electrodes of dissimilar metals adapted to be immersed in said liquid and measuring means for measuring the electric current produced, the improvement comprising an imperforate cup-like vessel for holding the liquid, said cup being mounted for rotation about its axis while inclined to the vertical, at least a portion of the sides of the cup being of metal and forming one electrode, at least a portion of the bottom of the cup being of a dissimilar metal and electrically insulated from the metallic sides of the cup forming the other electrode the liquid being in contact with both electrodes, and a bed of abrasive material of loose granular form but heavier than the liquid disposed in the angle between the bottom and the sides of the cup in contact with the dissimilar metals for cleaning the electrodes upon rotational movement of the cup, said abrasive material being electrically non-conductive and chemically inert.

References Cited in the file of this patent

UNITED STATES PATENTS

| 1,885,148 | Smith | Nov. 1, 1932 |

FOREIGN PATENTS

| 1,161 | Great Britain | Jan. 25, 1888 |
| 8,679 | Great Britain | Nov. 5, 1903 |
| 1,043,498 | France | Nov. 9, 1953 |